No. 833,319. PATENTED OCT. 16, 1906.
J. H. GILMAN.
CONVEYER.
APPLICATION FILED SEPT. 9, 1905.
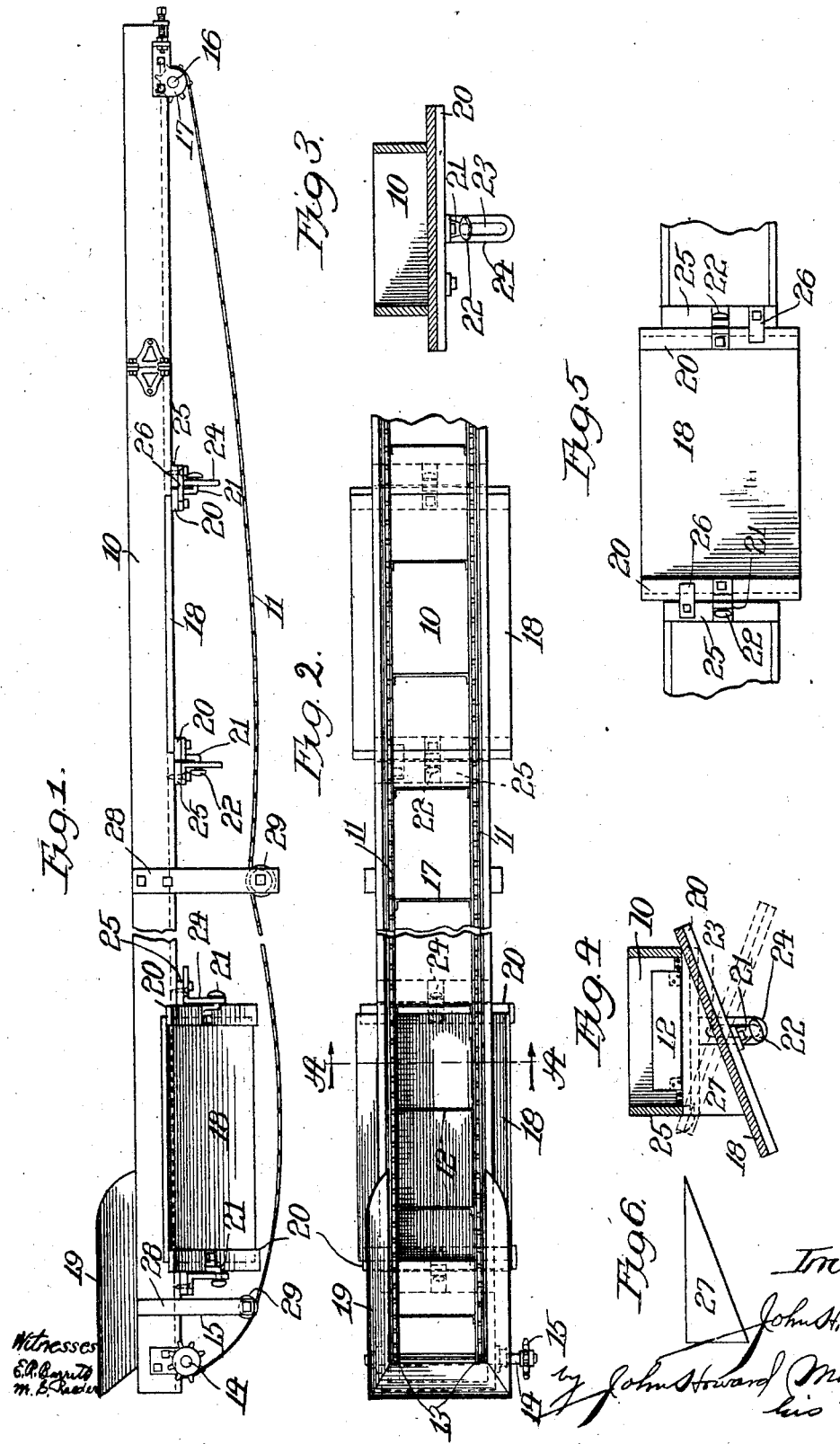

UNITED STATES PATENT OFFICE.

JOHN H. GILMAN, OF OTTAWA, ILLINOIS, ASSIGNOR TO KING & HAMILTON COMPANY, OF OTTAWA, ILLINOIS, A CORPORATION OF ILLINOIS.

CONVEYER.

No. 833,319.

Specification of Letters Patent.

Patented Oct. 16, 1906.

Application filed September 9, 1905. Serial No. 277,773.

*To all whom it may concern:*

Be it known that I, JOHN H. GILMAN, a citizen of the United States, residing at Ottawa, in the county of Lasalle and State of Illinois, have invented certain new and useful Improvements in Conveyers, of which the following is a specification.

My invention is concerned with conveyers of the trough variety, and is designed to produce a simple device of the class described in which the material delivered thereto can be discharged therefrom at any point and on either side thereof.

To illustrate my invention, I annex hereto a sheet of drawings in which the same reference characters are used to designate identical parts in all the figures, of which—

Figure 1 is a side elevation of a conveying apparatus embodying my invention. Fig. 2 is a top plan view of the same. Figs. 3 and 4 are vertical sections on the line A A of Fig. 2, but showing the apparatus in different positions of adjustment. Fig. 5 is an inverted plan view of a portion of the apparatus, and Fig. 6 is a side elevation of a removable portion of the apparatus.

The apparatus embodies a trough 10, which, except as hereinafter specified, may be of any desired construction and which is provided with the conveying mechanism, preferably consisting of the chains 11, connected at intervals by the conveyer slats or bars 12. The chains 11, which are preferably of the sprocket variety, are adapted to be driven by sprocket-wheels 13, secured on the shaft 14 inside of the trough, which shaft is journaled in suitable bearings and may be driven by means of the sprocket-wheel 15, secured to one end thereof. The shaft 16 at the other end of the trough may be journaled in the adjustable bearings 17, as shown, and is preferably provided with sprocket-wheels (not shown) for coöperating with the chains 11. The bottom 17 of the trough is of the ordinary construction, except that at intervals it is provided with the removable and adjustable sections 18, which, as shown, are preferably wider than the trough and which are adapted to be held up against the side pieces, as shown in Fig. 3, so as to close the bottom of the trough or to be let down and tilted in either direction, as shown in full and dotted lines in Fig. 4, so that the contents of the trough delivered thereto by the hopper 19 may be discharged on either side at any desired point, the sections 18 being located at intervals all along the length of the conveyer, which is supposed to be mounted over an elongated bin or a plurality of shorter bins. The bottom piece 18 has secured at the ends thereof the cross-strips 20, which overlap the fixed portions of the trough-bottom and which have secured thereto, preferably at their centers, the castings 21, which are provided with the headed pins 22, which project through the vertical slots 23 in the angular bracket-castings 24, which are secured to the bottom of the trough adjacent each of the removable sections, as clearly shown. These castings 24 are preferably secured to the cross-pieces 25, which are secured to the stationary portions of the bottom immediately adjacent the cross-pieces 20. I also preferably mount on these cross-pieces 25 the turn-buttons 26, which coöperate with the cross-pieces 20, as best shown in Fig. 5, to hold the sections 18 in place when they are not used for discharging purposes. When they are to be so used, the turn-buttons are adjusted so as to permit the sections 18 to be swung down to either side, and when thus swung down the removable triangular side pieces 27 are shoved in position to close the sides and prevent the accidental movement of the sections 18. To prevent the returning portions of the chain 11 from interfering with the sections 18 when they are in discharging position, I provide as many depending arms 28 as may be necessary, and these arms have mounted on their lower ends the rollers 29, which coöperate with the chain, as shown.

The operation of my invention will be readily apparent, and it will be understood that the trough proper may be of any desired length and shape and may be provided with any desired number of the adjustable sections 18, which may be located in any desired position.

While I have shown and described my invention as embodied in the form which I at present consider best adapted to carry out its purposes, it will be understood that it is capable of modifications and that I do not desire to be limited in the interpretation of the following claims, except as may be necessitated by the state of the prior art.

What I claim as new, and desire to secure by Letters Patent of the United States, is—

1. In a device of the class described, the combination with a trough, of the conveyer adapted to run therein, and the sections of the bottom of the trough adapted to be tilted to discharge through the aperture left in the bottom of the trough to either side thereof or to be held in position to form part of the bottom, thereby closing the aperture.

2. In a device of the class described, the combination with the trough, of the conveyer adapted to run therein, the bottom-sections of the trough adapted to be tilted to discharge on either side or to be held in position to form part of the bottom, the pins carried by the ends of said bottom-sections, and the slotted brackets secured to the trough adjacent thereto, substantially as and for the purpose described.

3. In a device of the class described, the combination with a trough, of the conveyer adapted to run therein, the sections of the bottom of the trough adapted to be tilted to discharge through the aperture left in the bottom of the trough to either side thereof, or to be held in position to form part of the bottom, means for holding said sections in their tilted position, and turn-buttons for holding them in their normal position.

4. In a device of the class described, the combination with the trough, of the conveyer adapted to run therein, the bottom-sections of the trough adapted to be tilted to discharge on either side or to be held in position to form part of the bottom, the pins 22 carried by the sections, the slotted brackets 24 carried by the trough, with which said pins coöperate, and the turn-buttons 26 carried by the trough and coöperating with the sections to hold them in their normal position.

5. In a device of the class described, the combination with the trough, of the conveyer adapted to run therein, and the bottom-sections of the trough adapted to be tilted to discharge on either side or to be held in position to form part of the bottom, said sections being wider than the trough, for the purpose described.

6. In a device of the class described, the combination with the trough, of the conveyer adapted to run therein, the bottom-sections of the trough adapted to be tilted to discharge on either side or to be held in position to form part of the bottom of the trough, and the side pieces 27 adapted to coöperate therewith, for the purpose described.

7. In a device of the class described, the combination with a trough, of the flexible conveyer adapted to run therein, the sections of the bottom of the trough adapted to be tilted to discharge through the aperture left in the bottom of the trough to either side thereof, or to be held in position to form a part of the bottom, thereby closing the aperture, and means for guiding the returning portions of the conveyer to prevent their interference with the bottom-sections when adjusted for discharging purposes.

8. In a device of the class described, the combination with a trough, of the flexible conveyer adapted to run therein, the sections of the bottom of the trough adapted to be tilted to discharge through the aperture left in the bottom of the trough to either side thereof, or to be held in position to form a part of the bottom, thereby closing the aperture, and means for guiding the returning portions of the conveyer to prevent their interference with the bottom-sections when adjusted for discharging purposes, said means consisting of the depending arms 28 having the rollers 29 coöperating with the conveyer.

In witness whereof I have hereunto set my hand this 1st day of September, 1905.

JOHN H. GILMAN.

Witnesses:
 WILL. A. HENDERS,
 GEO. P. HILLS.